Dec. 2, 1958 W. J. ALBERSHEIM 2,863,127

ELECTROMAGNETIC WAVE EQUALIZATION SYSTEM

Filed Dec. 31, 1953 2 Sheets-Sheet 1

INVENTOR
W. J. ALBERSHEIM
BY Hugh S. Wertz
ATTORNEY

Dec. 2, 1958 W. J. ALBERSHEIM 2,863,127

ELECTROMAGNETIC WAVE EQUALIZATION SYSTEM

Filed Dec. 31, 1953 2 Sheets-Sheet 2

INVENTOR
W. J. ALBERSHEIM
BY
Hugh S. Wertz
ATTORNEY

United States Patent Office
2,863,127
Patented Dec. 2, 1958

2,863,127

ELECTROMAGNETIC WAVE EQUALIZATION SYSTEM

Walter J. Albersheim, Madison, N. J., assignor to Bell Telephone Laboratories, Incorporated, New York, N. Y., a corporation of New York Application December 31, 1953, Serial No. 401,544
10 Claims. (Cl. 333—28)

This invention relates to electrical equipment employing high frequency electromagnetic waves, and more specifically to microwave systems and components involving reflection of the electromagnetic waves.

In electrical systems involving a broadband of frequencies it is often desirable to delay signals of one frequency to a greater extent than signals of other frequencies. In extended transmission systems employing wave guides, for example, electromagnetic waves of higher frequencies travel faster than lower frequencies. This gives rise to what is termed phase delay distortion, which may be corrected, or equalized, by delaying the higher frequency components to a greater extent than the lower frequencies. By analogy with the dispersive properties of an optical prism, an electrical component which progressively delays electrical signals of one frequency to a greater extent than signals of other frequencies is termed a "frequency dispersive" delay unit. Frequency dispersive delay units are also useful in pulse communication systems where it is desired to increase the signal-to-noise ratio, or the instantaneous amplitude, of broad band or variable frequency pulses. In these systems, it is particularly desirable to have the frequency dispersive delay unit adjusted to match the delay distortion of the line which is being equalized, or to complement the frequency versus time transmission characteristics of the pulses which are transmitted.

For use at lower frequencies, it has previously been proposed to construct adjustable networks having suitable delay versus frequency dispersion characteristics, through the use of lumped inductances and capacitances. In the microwave frequency region, however, these lumped constant circuits are impractical and it is not believed that any entirely satisfactory substitute for these networks at high frequencies has been developed up to the present time.

Accordingly, one object of the present invention is to selectively delay microwave signals extending over a broadband of frequencies in a simple and adjustable manner in order to match the dispersion characteristic of associated high frequency equipment.

In employing frequency dispersive delay elements to equalize delay distortion or to secure improved pulse transmission it may be desirable to apply the electromagnetic signal waves several times to a single dispersive delay element of the reflecting type. For example, a delay equalizer which operates on the reflection principle will produce two times as much equalization when an electromagnetic wave is applied to it twice, than it produces when the signal is only reflected from the equalizer once. Other microwave systems in which the double reflection of electromagnetic waves is often desirable are those involving pulses which have critical timing relationships with other pulses.

Thus, another object of the present invention is to couple electromagnetic waves to a reflecting microwave component so that the electromagnetic waves are applied to a single reflecting component twice.

The invention as viewed from one aspect involves the correction of an electromagnetic wave having dispersed frequency components through the use of a reflecting tapered section of wave guide and a specialized coupler for applying the electromagnetic wave to the tapered wave guide twice. In accordance with one somewhat broader aspect of the invention, it has been discovered that electromagnetic waves may be doubly reflected through the use of a plane of polarization selective wave guide element and a 45 degree Faraday effect unit coupled to a reflecting microwave component. In accordance with another broad aspect of the invention, it has been discovered that the delay versus frequency dispersion characteristic of a reflecting wave guide taper section can be varied by deforming the wave guide or by varying the position of a dielectric element within a section of a wave guide having tapered cut-off characteristics.

Additional objects and certain features and advantages of the invention will become apparent during the course of the following detailed description of specific illustrative embodiments thereof, from the appended claims and from the accompanying drawings. In the drawings:

Figure 2:
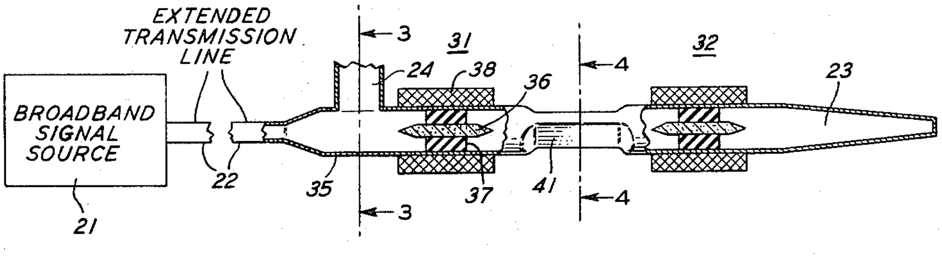
Figs. 2 through 4 represent a preferred form of the invention in which a doubly reflecting tapered section of wave guide is used to compensate for the delay distortion of an extended transmission line.
Figure 7:
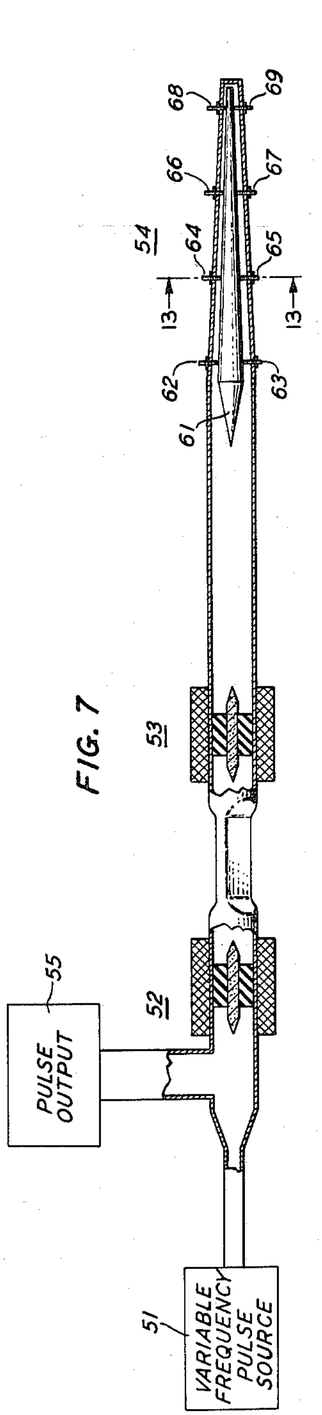
Fig. 7 is another showing of the preferred embodiment of the invention in which the doubly reflecting tapered unit is shown in somewhat greater detail and wherein this tapered unit is used to peak-up the output from a variable frequency pulse generator.
Figure 14:
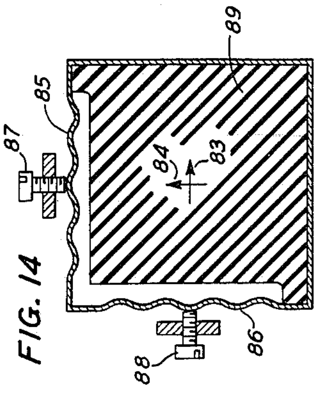
Figure 13:
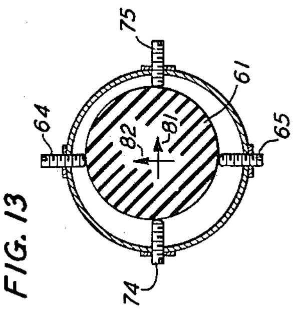

Figs. 8 through 12 are cross-sectional views illustrating various structures for varying the delay versus frequency characteristics of tapered reflecting wave guide sections; and Figs. 13 and 14 illustrate similar adjustments for biaxially symmetrical tapered structures which are desirable for use with the doubly reflecting systems of Figs. 2 and 7.

Figure 1:
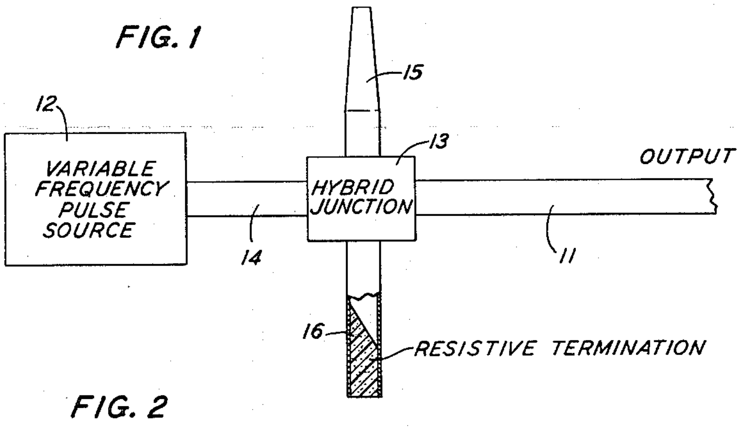
Fig. 1 illustrates the use of a tapered wave guide section to increase the instantaneous signal-to-noise ratio of a variable frequency pulse.

Fig. 1 shows, by way of example and for purposes of illustration, a pulse system in which the pulse at the output wave guide 11 may be substantially shorter and sharper than that at the output of the pulse source 12. This effect is particularly useful in pulse-signalling systems where the pulse sharpness may determine the information capacity of the equipment. Systems which operate in this manner are discussed in detail in S. Darlington's application Serial No. 136,289 filed December 31, 1949, now Patent No. 2,678,997, and will be reviewed but briefly here.

In Fig. 1, the pulse source 12 produces pulses which are of moderately long duration and vary in frequency from a high frequency at the start of the pulse to a substantially lower frequency at the end of the pulse. These pulses from the pulse generator 12 are coupled to the hybrid junction 13 by means of the wave guide 14. The energy applied to the hybrid junction divides with one-half of the energy entering the tapered section 15, and one-half being absorbed by the resistive termination 16. The tapered section 15 tapers down from a size sufficiently large to transmit the lowest frequency in the original pulse to a size at the constricted end insufficiently large to transmit the highest frequency in the original pulse. With each frequency component of the original pulse being reflected from the taper 15 at the cut-off point for that particular frequency, it is clear that the high frequency components will penetrate deeper into the taper sections than the lower frequency components.

Because of this greater depth of penetration, the reflected higher frequency components have a longer round trip transmission path and a correspondingly increased elapsed time before returning to the hybrid junction than the lower frequency components of the original pulse. With the difference in elapsed time for the highest and lowest frequency components being made equal to the pulse length, the high and low frequency components, reflected from the tapered section of wave guide 15, will arrive at the hybrid junction at substantially the same instant. The shape of the tapered wave guide section 15 is graduated so that the intermediate frequency components will also arrive at the hybrid junction at the same time. This has the effect of shortening the pulse and greatly increasing its instantaneous amplitude as compared with the noise present in the circuit. The loss of energy in the branch of the hybrid which has the resistive termination 16 can be regained by suitable amplifiers inserted before the hybrid 13 of Fig. 1. The sharpness of a pulse and the corresponding signal-to-noise ratio is independent of the absolute level of the signals. Another coupling arrangement, which avoids the loss of energy in one branch of the hybrid junction of Fig. 1, and provides for double reflection of the signal energy by the tapered wave guide section, is illustrated in Fig. 2. Before proceeding to a detailed consideration of Fig. 2, however, it should be noted that the "pulse sharpening" unit shown in Fig. 1 could be used at the receiver (not shown) of the pulse-signalling system, rather than at the transmitter to avoid unduly high energy levels. In addition, the equalizer disclosed in the present application could be located adjacent the source, rather than at the end of an extended transmission path.

In Fig. 2, the delay distortion of the broadband signal from the source 21 which is introduced by the extended transmission line 22 is corrected by being doubly reflected by the tapered section of conducting wave guide 23. Deferring discussion of the wave guide components which couple the transmission line 22 to the taper 23 and which couple the reflected signal to the output wave guide 24, the nature of the distortion introduced by the extended transmission line 22 will now be considered.

It is well known that in many transmission systems, waves of different frequencies are not propagated at the same velocity. Thus in the transmission of a broadband microwave signal over a long wave guide channel, the higher frequencies travel at a greater velocity than the lower frequencies, this giving rise, if uncorrected, to perceptible and in some cases serious distortion of the signals. One of the basic facts underlying the present invention is that the slope of the delay versus frequency characteristic of tapered reflecting wave guide elements is of the proper sign to compensate for the phase delay distortion of an extended transmission line.

Figure 5A:
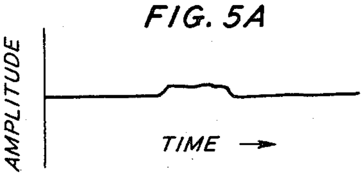
Figs. 5A and 5B represent a pulse as distorted by an extended transmission line before and after equalization by an appropriate tapered section of wave guide.
Figure 5B:
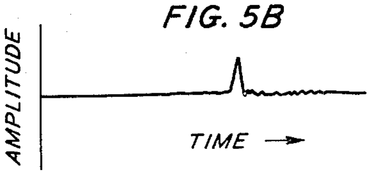
Figure 6A:
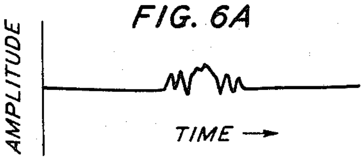
Figs. 6A and 6B are plots similar to those of Figs. 5A and 5B for two closely spaced pulses.
Figure 6B:
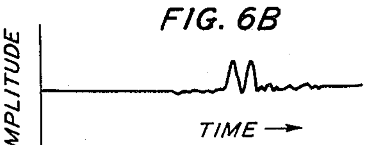

Figs. 5A, 5B, 6A and 6B illustrate the distortion of pulse signals and their correction by tapered reflecting wave guide sections. Fig. 5A is taken from an actual oscilloscope pattern of a long pulse with progressively decreasing frequency which is the equivalent of a sharp pulse after it has been transmitted over an extended transmission line. In Fig. 5B, however, the oscilloscope pattern represents the pulse after it has been reconstituted by a tapered equalizer of the type shown in Figs. 1 or 2. Figs. 6A and 6B represent two closely spaced pulses before and after equalization by a tapered reflecting wave guide section. The physical reason for the jagged pulse shape of Fig. 6A lies in the beats between two overlapping pulses of varying frequencies. However, when the various frequency components of each pulse are restored to substantial time coincidence with each other by a tapered delay equalizer, the pulses are restored to their original shape, as illustrated in Fig. 6B.

Returning to a consideration of the means in Fig. 2 for coupling the input wave guide 22 to the tapered section of wave guide 23, and the doubly reflected wave to the output wave guide 24, the nature of the two 45 degree Faraday effect units 31 and 32 must be discussed in some detail. It is known that when a polarized electromagnetic wave is applied to an insulating ferromagnetic material which is magnetically polarized in the direction of propagation of the electromagnetic wave, the plane of polarization of the electromagnetic wave will be rotated in a non-reciprocal manner. This type of wave guide unit is termed a microwave Faraday effect unit, and the effect is discussed in detail in an article by C. L. Hogan entitled "The Microwave Gyrator" which appeared at pages 1–31 of the January, 1952 issue of the Bell System Technical Journal. A recent Patent No. 2,644,930 granted July 7, 1953 to C. H. Luhrs et al., also discloses a Faraday effect device.

The Faraday effect unit 31 of Fig. 2 is made up of a circular section of conducting wave guide 35, a central pencil of non-conducting ferromagnetic material 36, a dielectric support 37 for the pencil 36, and a magnet 38, for applying a longitudinal field to the ferromagnetic pencil 36. The ferromagnetic pencil 36 may be constructed of a polycrystalline ferrite such as $(NiZn)Fe_2O_3$ which is powdered and embedded in a dielectric matrix. Other non-conducting ferromagnetic materials which exhibit similar properties are known and have been discussed in the literature pertaining to this subject matter. The dielectric supporting member 37 is preferably of low dielectric constant, and may be constructed from an aerated dielectric material such as polyfoam. The Faraday effect unit 32 is of substantially the same construction as that of the unit 31.

Figure 3:
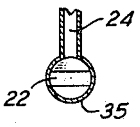

The length of the ferromagnetic pencil 31 and the intensity of the magnetic field are adjusted so that electromagnetic waves from the extended transmission line 22 will have their plane of polarization shifted 45 degrees counter-clockwise from their original vertical polarization, in passing through the Faraday effect unit 31. This shift will orient the electric vector parallel to the narrow side walls of the rectangular wave guide 41 so that the electromagnetic wave is accepted (and not reflected) by the wave guide 41. After passing through the plane of polarization selective means 41, the electromagnetic wave is rotated another 45 degrees counter-clockwise (as viewed from left to right in Fig. 2) and is reflected from the tapered wave guide 23. The electromagnetic wave is then rotated in the same absolute direction, counter-clockwise (as viewed from left to right) and thus has its electric vector parallel to the longer side walls of the wave guide 41. Under these circumstances the electromagnetic wave is reflected at the right-hand end of the wave guide 41. After a second round trip through the Faraday unit 32 and further equalization by the tapered wave guide 23. the electromagnetic wave has been rotated another 90 degrees and is now oriented in the proper plane to be accepted by the rectangular wave guide 41. In passing from right to left through the Faraday effect unit 31, the electromagnetic wave is rotated another 45 degrees in the same absolute sense (counter-clockwise as viewed from left to right) and the electric vector of the electromagnetic wave in the circular wave guide 35 is now horizontal, or parallel with the broader side wall of the rectangular wave guide 22, as may be clearly observed in Fig. 3. An electromagnetic wave of this orientation cannot, of course, be coupled into the wave guide 22 and will be coupled to the output branch wave guide 24 as shown in Figs. 2 and 3. The structure and mode of operation of the coupling between the circular wave guide 35 and the mutually orthogonal wave guides 22 and 24 is shown and described in much greater detail in S. E. Miller's application Serial No. 263,600 filed December 27, 1951.

In the operation of the equalizer of Fig. 2, the electromagnetic waves were reflected into the tapered wave guide section 23 twice, in contradistinction with the single reflection into the tapered wave guide 15 of Fig. 1. The delay dispersion of the tapered section of wave guide 23 of the doubly reflecting system of Fig. 2 would necessarily be one-half that required for equalization of the transmission line 22, and the tapered section 23 is one half as long as would be required if the electromagnetic waves were reflected into it but once. Where the delay distortion is substantial, and unduly long tapered sections would normally be required for equalization, substantial saving in space may be accomplished by the addition of the Faraday effect unit 32 and the reduction of the length of the tapered section of wave guide by one-half. If the tapered section required to correct for the delay distortion of the extended transmission line 22 with a single reflection into the tapered section, is not unduly long, the rectangular wave guide 41 and the second Faraday effect unit 32 may be deleted, and the tapered section may be coupled directly to the right-hand end of the Faraday unit 31. Appropriate considerations of the plane of polarization of the incident and reflected electromagnetic waves applied from wave guide 22 will reveal that waves reflected from the tapered section will again be coupled over to the output wave guide 24.

It may be observed that the non-reciprocal coupling unit comprising the Faraday effect unit 31 and the connections to the tapered wave guide and to the input and output wave guides replaces the hybrid junction of Fig. 1 and has the additional advantage that substantially all of the input energy is transferred to the output. This type of non-reciprocal coupling arrangement is known as a circulator. Other types of circulators are discussed in the above-noted article of C. L. Hogan and in S. E. Miller's application Serial No. 371,437 filed July 31, 1953. Any of these circulators may be used in place of the hybrid 13 of Fig. 1 and in place of the Faraday effect unit 31 and its associated terminals as shown in Fig. 2.

Figure 4:
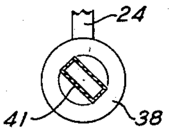

In Fig. 7, an arrangement of coupling elements and a tapered section of wave guide similar to that of Figs. 2 through 4 is employed to peak-up variable frequency pulses in the manner disclosed in conjunction with Fig. 1. In Fig. 7, the pulse source 51 applies variable frequency pulses to the circulator 52 which in turn routes the pulses to the Faraday effect unit 53 and the variable taper 54. After the instantaneous amplitude of the pulse is intensified and its length reduced by double reflection into the tapered unit 54, the circulator 52 couples it to the output circuit 55. Because of the double reflection into the tapered unit 54, the delay dispersion of the tapered wave guide 54 for two reflections with the electromagnetic waves successively oriented in orthogonal planes is equal to the lentgh of the variable frequency pulses from the source 51. This in in contrast to the system of Fig. 1 in which the difference in delay for the highest and lowest frequencies of the pulse after a single reflection is equal to the difference in delay for these frequencies in the tapered wave guide 15.

For the systems of Figs. 1, 2 or 7 it is often desirable to be able to vary the delay dispersion of the tapered section in order to more nearly complement the particular dispersion characteristic of associated electrical components, such as an extended transmission line or a variable frequency pulse source. This may be accomplished by varying the cut-off frequency of the tapered section of wave guide at successive points along its length in any desired manner. In Figs. 8 through 11 the cut-off frequency at various points along the length of the tapered wave guide sections is varied by deformation of the conducting wave guiding passageway. In Figs. 12 and 13, the cut-off frequency is varied by shifting a dielectric core member to regions within the wave guide having different electromagnetic field intensities. In this latter type of arrangement, shifting the dielectric core member to a region of different field intensity has the effect of changing the average dielectric constant across the wave guide cross-section, and thus changes the cut-off frequency.

In the system of Fig. 7 an adjustable dielectric core member 61 is shown located within the tapered section of wave guide 54. With the dielectric core member being somewhat flexible, the adjusting screws 62 through 69 serve to adjust the delay dispersion characteristic effectively throughout the range of the tapered unit and can thus increase or decrease the delay in particular frequency ranges by the relative displacement of the dielectric core member. The enlarged cross-sectional view of Fig. 13 is taken along lines 13—13 of Fig. 7 and illustrates the core member 61 held in a displaced position by means of the screws 64, 65, 74 and 75. The circular configuration of Fig. 13 or the square wave guide construction of Fig. 14 are particularly suitable for the tapered unit 54 of Fig. 7 because of the double reflection with the electromagnetic field pattern being in mutually orthogonal planes in successive reflections. With these cross-sectional arrangements, the electromagnetic waves polarized in the two planes indicated by the arrows 81, 82 of Fig. 13 and arrows 83, 84 of Fig. 14 see substantially the same characteristic impedance in the tapered sections and undergo aproximately the same amount of delay distortion. The cut-off frequency of a tapered section of wave guide constructed as shown in Fig. 14 may be varied by bending the corrugated flexible conducting wave guide walls 85 and 86 by the use of a plurality of adjusting screws such as are shown at 87, 88. The dielectric filler material 89 merely serves to give the wave guide section rigidity.

Figure 11:
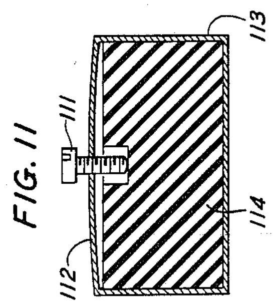
Figure 10:
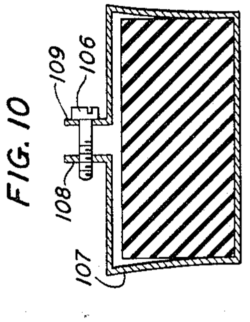
Figure 9:
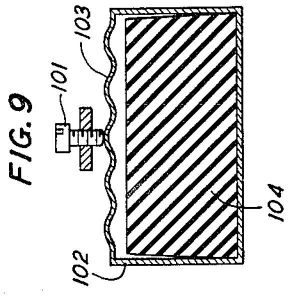
Figure 8:
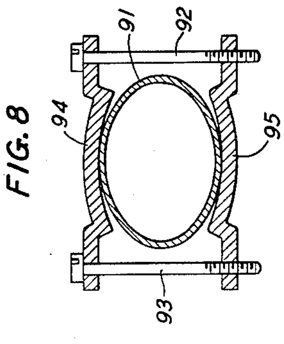
Figure 12:
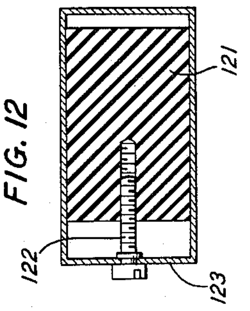

The tapered wave guide structures shown in cross-section in Figs. 8 through 12 are employed for adjustment purposes when the electromagnetic wave is only reflected once from the tapered section of wave guide. In Fig. 8 the cut-off frequency of the wave guide 91 is varied by the adjustment of the screws 92, 92 to vary the ellipticity of the wave guide as the spacing of the yoke members 94, 95 is varied. In Fig. 9 a plurality of adjusting screws such as 101 serve to vary the excess height of the wave guide 102 over the dielectric filler 104 by exerting pressure on the flexible wall 103 of the wave guide. In Fig. 10 adjusting screws such as 105 vary the cross-section of the conducting wave guide 107 by exerting pressure on the out-turned flanges 108, 109 of the wave guide. In Fig. 11 the adjusting screw 111 deforms one of the broader side walls 112 of the tapered wave guide structure 113 by exerting pressure against the dielectric core member 114. In Fig. 12, the dielectric core member 121 is displaced by the adjusting screw 122 which is threaded in the core member 121, and rotatably secured to the wave guide wall 123. The structure of Fig. 12 operates much like that of Fig. 13 by shifting the core member relative to the field intensity of the electromagnetic wave in the tapered section.

When the term "tapered wave guide" or "tapered wave guide section" is employed in the present specification and claims, it signifies that the component in question has tapered cut-off characteristics, and not necessarily that the conducting portion of the wave guide is physically constricted in size. Inasmuch as the cut-off frequency of a wave guide is inversely proportional to the square root of the permeability and the dielectric constant as well as being inversely proportional to the wave guide dimensions the tapered wave guides may be constructed of a section of wave guide having a uniform cross-section but including a dielectric core member which tapers along the length of the wave guide section, for example. The dielectric constant could also be varied by tapering the amount of metal dust or compounds (such as lead chlorite and barium titanate) dispersed in a matrix such as polystyrene.

Inasmuch as the presence of dielectric material tends to increase the effective cross-section of the wave guide, the portions of the high dielectric constant sections of the wave guide should face the applied electromagnetic waves.

It is noted that an application of J. R. Pierce, Serial No. 401,448 filed on December 31, 1953, concurrently with the present application deals with subject matter which is closely related to that disclosed in the present application.

It is to be understood that the above-described arrangements are illustrative of the application of the principles of the invention. Numerous other arrangements may be devised by those skilled in the art without departing from the spirit and scope of the invention.

What is claimed is:

1. In a non-reciprocal Faraday effect microwave system, two spaced Faraday effect wave guide units, each said Faraday effect unit comprising means including a magnetically polarized nonconducting medium for rotating the electromagnetic field pattern of applied electromagnetic wave energy substantially 45 degrees, wave guide means for transmitting electromagnetic waves of only one polarization and for reflecting an orthogonal polarization interconnecting said Faraday units, and substantially lossless means for reflecting electromagnetic waves of all polarizations coupled to one of said Faraday effect units so that wave energy transmitted from the other of said Faraday effect units by said interconnecting wave guide means in said one polarization is multiply reflected between said wave guide means and said reflecting means until it is rotated by said one Faraday effect unit back into said one polarization.

2. A microwave system as defined in claim 1 wherein said reflecting means is a tapered section of wave guide, the cross-section of said tapered wave guide at the smaller end thereof being less than the critical cross-section required for cut-off for the highest frequency in the applied electromagnetic waves.

3. In a non-reciprocal Faraday effect microwave system, two spaced Faraday effect wave guide units, each said Faraday effect unit comprising means including a magnetically polarized nonconducting medium for rotating the electromagnetic field pattern of applied electromagnetic wave energy substantially 45 degrees, wave guide means for transmitting electromagnetic waves of only one polarization interconnecting said Faraday units, a substantially lossless means for reflecting electromagnetic waves of all polarizations coupled to one of said Faraday effect units, means for coupling to a first one of said Faraday effect units in a second plane of polarization inclined at 45 degrees to said one polarization, and means for coupling to said first Faraday effect unit in a plane of polarization perpendicular to said second plane of polarization.

4. In combination, two spaced Faraday effect wave guide units coupled to each other for a single polarization of electromagnetic wave energy therebetween, each said Faraday effect unit comprising means including a magnetically polarized nonconducting medium for rotating the electromagnetic field pattern of applied electromagnetic wave energy substantially 45 degrees, means for applying electromagnetic wave energy to one of said units in a plane of polarization inclined at 45 degrees to said single polarization, and a tapered reflecting section of wave guide coupled to one of said units, the cross-section of said tapered wave guide at the smaller end of said tapered section of wave guide being less than the critical cross-section required for cut-off for the highest frequency in the applied electromagnetic waves.

5. A combination as defined in claim 4 wherein said tapered section of wave guide is of substantially circular cross-section.

6. A combination as defined in claim 4 wherein said tapered section of wave guide is of substantially square cross-section.

7. The combination according to claim 4 including an element of solid dielectric material in said tapered wave guide section, means for causing relative movement between at least a portion of said tapered wave guide section and said dielectric element, the combination of said tapered wave guide section and said dielectric element having a predetermined delay versus frequency dispersion characteristic, and microwave circuital means having a dispersion characteristic which is complementary with said predetermined characteristic included in said means for applying electromagnetic wave energy.

8. A combination as set forth in claim 7 wherein at least one wall of said tapered wave guide section is yieldable and including means for adjusting the position of said yieldable wall relative to said dielectric element, and thereby adjusting the delay versus frequency dispersion characteristic of said tapered wave guide section.

9. In combination, a polarization selective wave guide component for transmitting wave energy of one polarization and for reflecting wave energy of an othogonal polarization, a Faraday effect wave guide unit coupled to said component, said Faraday effect unit comprising means including a magnetically polarized nonconducting medium for rotating the electromagnetic field pattern of applied electromagnetic wave energy substantially 45 degrees, and a tapered section of wave guide coupled to said Faraday effect unit, said tapered wave guide including means for providing substantially equal cut-off characteristics for waves polarized in two mutually orthogonal planes.

10. In combination, a source of microwave energy having a phase characteristic that varies with the frequency of the wave energy, a section of wave guide having a tapered cut-off characteristic that progressively reflects wave energy components of different frequency as the wave applied to one end of said section propagates into said section, polarization selective means for coupling wave energy of one polarization and for reflecting wave energy of an orthogonal polarization connected between said source and said one end of said section, and Faraday effect means including a magnetically polarized non-conducting medium for rotating the polarization of wave energy applied in said one polarization through 45 degrees, said Faraday effect means being interposed between said coupling means and said section so that wave energy coupled from said source is multiply reflected within said section before being reaccepted by said polarization selective means.

References Cited in the file of this patent

UNITED STATES PATENTS

| | | |
|---|---|---|
| 2,514,779 | Martin | July 11, 1950 |
| 2,563,612 | Nebel | Aug. 7, 1951 |
| 2,577,146 | Norton | Dec. 4, 1951 |
| 2,607,849 | Purcell et al. | Aug. 19, 1952 |
| 2,644,930 | Luhrs et al. | July 7, 1953 |
| 2,767,379 | Mumford | Oct. 16, 1956 |